United States Patent
Vasquez et al.

(10) Patent No.: US 8,573,474 B2
(45) Date of Patent: Nov. 5, 2013

(54) TECHNICAL SUPPORT SYSTEMS AND METHODS

(75) Inventors: Juan Vasquez, Gibsonton, FL (US); Prashant B. Desai, Land O' Lakes, FL (US); Haridas B. Bhogade, Plant City, FL (US); Parind S. Poi, Lewisville, TX (US); Mayuresh M. Hegde, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 165 days.

(21) Appl. No.: 13/086,878

(22) Filed: Apr. 14, 2011

(65) Prior Publication Data

US 2012/0261465 A1    Oct. 18, 2012

(51) Int. Cl.
    *G06F 17/00*    (2006.01)
(52) U.S. Cl.
    USPC ................. 235/375; 235/462.41; 235/494
(58) Field of Classification Search
    None
    See application file for complete search history.

(56) References Cited

U.S. PATENT DOCUMENTS

| | | | |
|---|---|---|---|
| 2009/0154759 A1* | 6/2009 | Koskinen et al. | 382/100 |
| 2012/0128267 A1* | 5/2012 | Dugan et al. | 382/321 |
| 2012/0217293 A1* | 8/2012 | Martch et al. | 235/375 |
| 2012/0222081 A1* | 8/2012 | Schaefer et al. | 725/132 |

* cited by examiner

*Primary Examiner* — Thien M Le
*Assistant Examiner* — Sonji Johnson

(57) ABSTRACT

Exemplary technical support systems and methods are disclosed herein. An exemplary method includes a media content access device obtaining technical support request information from a user, encoding data representative of the technical support request information into a barcode, and providing the barcode for display on a display screen associated with the media content access device. The exemplary method may additionally or alternatively include a mobile device capturing an image of the displayed barcode and transmitting data representative of the image to a technical support subsystem. The exemplary method may additionally or alternatively include a technical support subsystem receiving data representative of the image of the barcode, decoding the barcode code to obtain the technical support request information, and performing one or more technical support operations in response to the technical support request information. Corresponding methods and systems are also disclosed.

24 Claims, 10 Drawing Sheets

Technical Support Request

User Name: Charles
Account Number: 123456789
Callback Phone Number: (555) 555-5555
Callback Phone Type: Mobile
Callback Date: Today
Callback Time: Evening (6:00 pm – 9:00 pm)

Submit    Clear All

Fig. 6

TECHNICAL SUPPORT SYSTEMS AND METHODS

BACKGROUND INFORMATION

The advent of set-top box devices and other media content access devices ("access devices") has provided users with access to a variety of services (e.g., television services, Internet services, telephone services, etc.). For example, a user may utilize a set-top box device to access broadcast television services, pay-per-view services, video-on-demand services, Internet services, and audio programming services.

However, access devices and/or corresponding service providers inevitably experience technical problems that result in service disruptions for users. The problems may be aggravated if the access devices are incapable of communicating with a service provider's remote systems (e.g., because of or in conjunction with the experienced problems), thereby hindering the service provider's ability to learn of, troubleshoot, and/or resolve the problems that are causing the service disruptions. In order to address the problems and/or service disruptions, users may be forced to make telephone calls directly to the service provider's technical support department, which may result in the users waiting on hold for available technical support agents, interacting with computer-based voice response systems, providing identification information and waiting until the users have been identified by the system/agent, waiting while troubleshooting tests are performed, and/or trying to explain problems that the users may not entirely understand. This process may be inconvenient, burdensome, and/or frustrating for the users, thereby leading to dissatisfaction with the service provider.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6-7 illustrate views of an exemplary graphical user interface according to principles described herein.

DETAILED DESCRIPTION OF PREFERRED EMBODIMENTS

Exemplary technical support systems, devices, and methods are disclosed herein. In accordance with principles described herein, a barcode based technical support request may be generated, transmitted, and/or processed in a manner that is convenient for a user and efficient for a service provider. For example, an exemplary media content access device may be configured to obtain technical support request information from a user, encode data representative of the technical support request information into a barcode, and provide the barcode for display on a display screen associated with the media content access device (e.g., a display screen integrated into the media content access device, a display screen of a display device communicatively coupled to the media content access device, etc.). While the barcode is being displayed, a mobile device (e.g., a mobile telephone device, a tablet computer, etc.) may be configured to capture an image (e.g., a photograph, a video, etc.) of the displayed barcode and transmit data representative of the image to a remote technical support subsystem. The technical support subsystem may be configured to receive the data representative of the image of the barcode, decode the barcode code to obtain the corresponding technical support request information, and perform one or more technical support operations in response to the technical support request information. In accordance with the methods and systems disclosed herein, a user may be able to initiate a technical support request despite an inability of the media content access device to communicate with a corresponding service provider and/or without having to call the service provider's technical support department, thereby avoiding disadvantages associated with a traditional technical support experience. Additionally or alternatively, a service provider may utilize the methods and systems disclosed herein to more efficiently control and/or manage technical support operations and resources. Exemplary technical support systems and methods will now be described in reference to the drawings.

Figure 1:
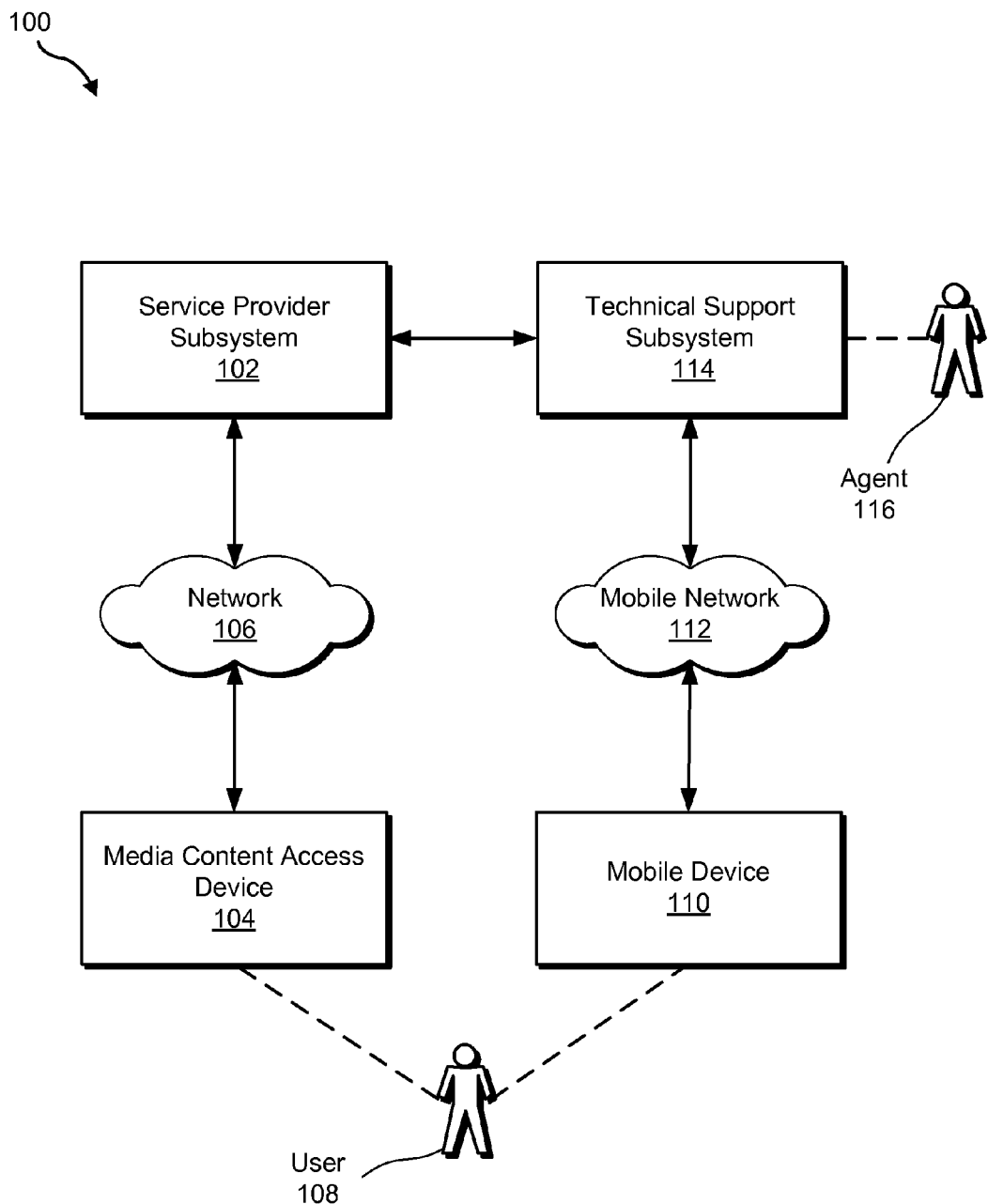
FIG. 1 illustrates an exemplary technical support system according to principles described herein.

FIG. 1 illustrates an exemplary technical support system 100 (or simply "system 100"). As shown, system 100 may include, without limitation, a service provider subsystem 102 (or simply "provider subsystem 102") communicatively coupled to a media content access device 104 (or simply "access device 104") over a network 106. A user 108 may be associated with access device 104 and/or a mobile device 110 configured to communicate, by way of a mobile network 112, with a technical support subsystem 114. In some examples, technical support subsystem 114 may be associated with and/or communicatively coupled to service provider subsystem 102. Additionally or alternatively, a technical support agent 116 may be associated with technical support subsystem 114.

Components of system 100 may communicate with one another using any suitable communication technologies, devices, media, and protocols supportive of data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies (e.g., Bluetooth, Wi-Fi, etc.), in-band and out-of-band signaling technologies, and other suitable communications technologies.

As mentioned, components of system 100 may be configured to communicate with each other over network 106 and/or mobile network 112. Network 106 and/or mobile network 112 may include one or more networks or types of networks capable of carrying communications and/or data signals between the components of system 100. For example, each of network 106 and mobile network 112 may include, without limitation, one or more cable networks, optical fiber networks, hybrid fiber coax networks, wireless networks (e.g., a Wi-Fi network), wireless data communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), local area networks, wireless broadcast networks, subscriber television networks, provider-specific networks, the Internet, an intranet, local area networks, any other suitable network, and/or any combination or sub-combination of these networks. In certain embodiments, mobile network 112 may include one or more wireless data communication networks and/or mobile telephone networks (e.g., a 3G or 4G network).

In certain implementations, network 106 and mobile network 112 may form separate and/or independent communication channels. For example, network 106 may include a subscriber television network, and mobile network 112 may include a mobile telephone network that is separate and distinct from the subscriber television network.

Service provider subsystem 102 may be configured to generate, manage, and/or provide one or more services for access by access device 104. For example, user 108 may utilize access device 104 to access broadcast television services, pay-per-view services, video-on-demand services, Internet services, voice over IP services, audio programming services, and/or other services provided by service provider subsystem 102.

Access device 104, mobile device, and/or technical support subsystem 114 may be configured to facilitate the creation, transmission, and/or processing of a technical support request related to access device 104, provider subsystem 102, network 106, and/or one or more services provided by provider subsystem 102 to access device 104 over network 106. For example, as will be explained in more detail below, access device 104 may be configured to obtain technical support request information from user 108, encode the technical support information into a barcode (e.g., a two-dimensional barcode), and provide the barcode for display to user 108. Additionally or alternatively, user 108 may utilize mobile device 110 and/or a corresponding camera device to capture an image of the displayed barcode and transmit data representative of the captured image to technical support subsystem 114 by way of mobile network 112. Technical support subsystem 114 may be configured to receive data representative of an image of a barcode, decode the barcode to obtain the technical support request information, and perform one or more technical support operations in response to the technical support request information.

Provider subsystem 102, access device 104, mobile device 110, and technical support subsystem 114 may each be implemented as may suit a particular implementation. For example, each of provider subsystem 102 and/or technical support subsystem 114 may be implemented by one or more computing devices (e.g., one or more remote server devices). In some examples, access device 104 may be implemented by one or more media content access devices, which may include, but are not limited to, a set-top box device, a DVR device, a media content processing device, a communications device, a mobile access device (e.g., a laptop computer, a tablet computer, etc.), a personal computer, a gaming device, a television device, and/or any other device configured to perform one or more of the processes and/or operations described herein. Additionally or alternatively, mobile device 110 may be implemented by any suitable mobile computing device (e.g., a mobile phone device, a handheld device, a laptop computer, a tablet computer, a personal-digital assistant device, etc.). In some examples, mobile device 110 may be associated with a camera device (e.g., a camera device may be integrated into mobile device 110 and/or configured to communicatively couple to mobile device 110).

Figure 2:
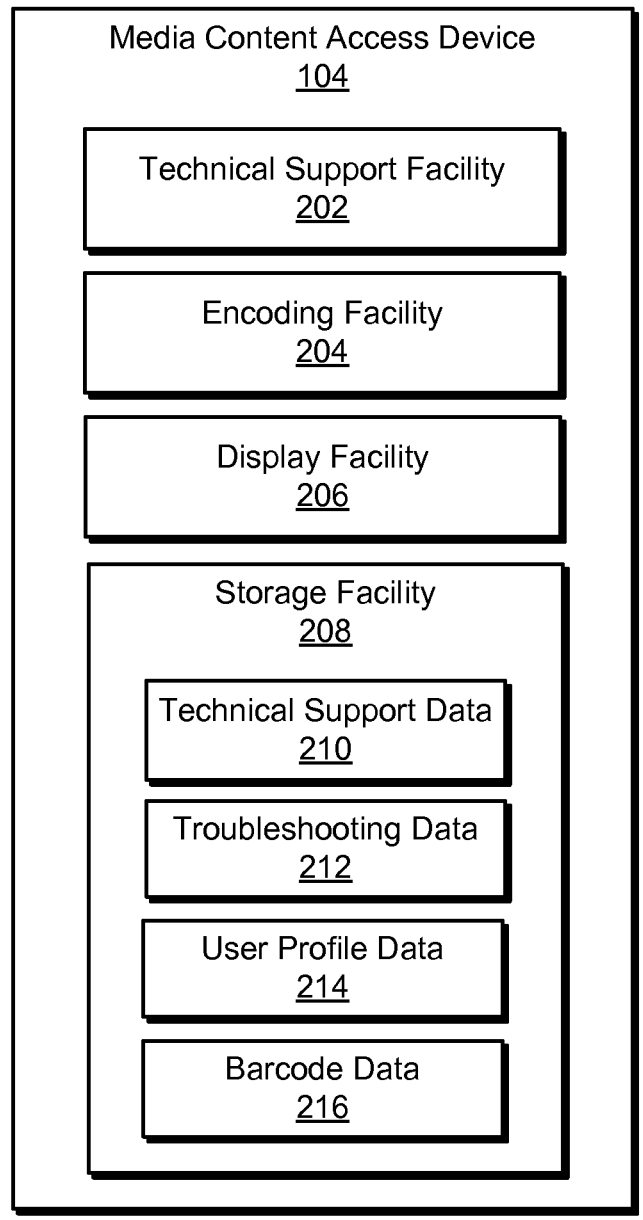
FIG. 2 illustrates an exemplary media content access device of the system of FIG. 1 according to principles described herein.

FIG. 2 illustrates an exemplary implementation of access device 104. As shown, access device 104 may include a technical support facility 202, an encoding facility 204, a display facility 206, and a storage facility 208 selectively and communicatively coupled to one another. It will be recognized that although facilities 202-208 are shown to be separate facilities in FIG. 2, any of facilities 202-208 may be combined into fewer facilities, such as into a single facility, or divided into more facilities as may serve a particular implementation. Any suitable communication technologies, including any of the communication technologies mentioned herein, may be employed to facilitate communications between facilities 202-208.

Technical support facility 202 may be configured to obtain technical support request information from a user (e.g., user 108) of access device 104 and/or associated with a technical problem being experienced by user 108 and/or access device 104.

As used herein, "technical support request information" may include any suitable information associated with a technical support request. For example, technical support request information may include information associated with a request to be contacted by a technical support agent. To illustrate, technical support request information may include a preferred contact method (e.g., phone, e-mail, chat, etc.), contact information (e.g., a contact telephone number, an e-mail address, etc.), a preferred contact day (e.g., a particular day of the week, a specific date, etc.), a preferred contact time period (e.g., morning, afternoon, evening, a particular time of day, etc.), user identification information (e.g., a user's name, an account number, a password, etc.), and/or any other suitable information associated with a request to be contacted by a technical support agent. In some examples, the technical support request information may include authentication information (e.g., a username and a password) associated with a user (e.g., an end user, a field technician, etc.) and configured to authenticate the user's identity and/or provide the user with access to one or more corresponding services, agents, and/or options. In additional or alternative examples, technical support request information may include information associated with one or more problems being experienced by a user and/or associated with a media content access device. For example, technical support request information may indicate a technical support category associated with the problems, a description of the problems being experienced, and/or any other suitable information associated with the problems.

As used herein, a "problem associated with a media content access device" and/or a "problem experienced by a media content access device" may refer to any problem that results in a disruption and/or degradation of services to the media content access device. For example, a problem associated with and/or experienced by access device 104 may include any suitable hardware problem, software problem, compatibility problem, service quality problem, and/or connectivity problem associated with access device 104, service provider subsystem 102, network 106 and/or any corresponding communication devices (e.g., a network interface device, such as an optical network terminal) and/or media. In some examples, a problem associated with and/or experienced by a media content access device may result in, cause, and/or coincide with an inability of the media content access device to communicate with one or more remote systems associated with a service provider (e.g., provider subsystem 102, technical support subsystem 114, etc.), thereby preventing the media content access device from transmitting technical support request information directly to the service provider. A media content access device may be configured to detect problems associated with the media content access device in any suitable manner.

Technical support facility 202 may be configured to obtain technical support information from a user in any suitable manner. For example, technical support facility 202 may be configured to receive user input of technical support request information provided by a user by way of an input device (e.g., a remote control device, a touch screen device, a keypad, etc.). Additionally or alternatively, technical support facility 202 may be configured to generate, provide, and/or manage a graphical user interface configured to facilitate user input of technical support request information. For example, technical support facility 202 may be configured to launch a graphical user interface in response to detecting a problem associated with access device 104, detecting an inability of access device 104 to communicate with provider subsystem 102 and/or technical support subsystem 114, and/or detecting a request provided by user 108 to facilitate entry of technical support request information. In some examples, the graphical user interface may be provided in conjunction with one or more operations of an on-board troubleshooting agent implemented by access device 104 and/or a corresponding troubleshooting graphical user interface provided by access device 104. Additionally or alternatively, technical support facility 114 may utilize the graphical user interface to ask user 108 one or more troubleshooting questions and/or direct user 108 to perform one or more troubleshooting tasks.

In addition to obtaining technical support request information, technical support facility 202 may be configured to detect and/or collect any other suitable information associated with access device 104 and/or user 108. For example, technical support facility 202 may be configured to collect a serial number associated with access device 104, user profile information associated with user 108, location information associated with access device 104, troubleshooting information associated with access device 104 (e.g., information associated with one or more troubleshooting and/or diagnostic tests performed by access device 104), an error code associated with access device 104, hardware and/or software information associated with access device 104, manufacturer and/or model information associated with access device 104, computing environment information associated with access device 104 (e.g., information identifying one or more electronic devices to which access device 104 is connected), usage information associated with access device 104 and/or user 104, account information associated with user 108, subscription and/or privilege information associated with access device 104 and/or user 108, and/or any other suitable information associated with access device 104 and/or user 108. In some examples, technical support facility 202 may be configured to selectively combine any of the foregoing additional information with corresponding technical support request information (e.g., for delivery to technical support subsystem 114).

Encoding facility 204 may be configured to encode data representative of technical support request information and/or any other suitable information into a barcode. Encoding facility 204 may utilize any suitable barcode technologies and/or symbologies to encode the information into a barcode. In some examples, encoding facility 204 may be configured to encode the information into a matrix (two-dimensional) barcode using any suitable matrix barcode technologies/symbologies (e.g., Datamatrix, Quick Response ("QR") Code, Aztec Code, PDF417, PaperDisk, MaxiCode, InterCode, mCode, MMCC, ShotCode, WaterCode, etc.). In some examples, encoding facility 204 may be configured to selectively determine what technical support request information to encode into the barcode based on data limitations associated with the barcode (e.g., size limitations and/or data capacity of the barcode). For instance, encoding facility 204 may be configured to prioritize certain technical support request information (e.g., user contact information such as a callback telephone number and/or time) over other information for inclusion in a barcode.

Display facility 206 may be configured to provide a barcode (e.g., a barcode encoded by encoding facility 204) for display to user 108. For example, display facility 206 may be configured to display the barcode on a display screen integrated into access device 104, provide the barcode to a display device (e.g., a television device) for display by the display device, and/or provide the barcode for display to user 108 in any other suitable manner. In some examples, the barcode may be displayed within a graphical user interface provided by technical support facility 202, as will be explained in more detail below.

Storage facility 208 may be configured to maintain technical support request data 210 representative of technical support request information (e.g., received from user 108), troubleshooting data 212 representative of one or more problems and/or troubleshooting operations associated with access device 104, user profile data 214 representative of user profile information associated with user 108, and barcode data 216 representative of one or more barcodes (e.g., encoded by encoding facility 204). Storage facility 208 may be configured to maintain additional or alternative data, such as disclosed herein.

Figure 3:
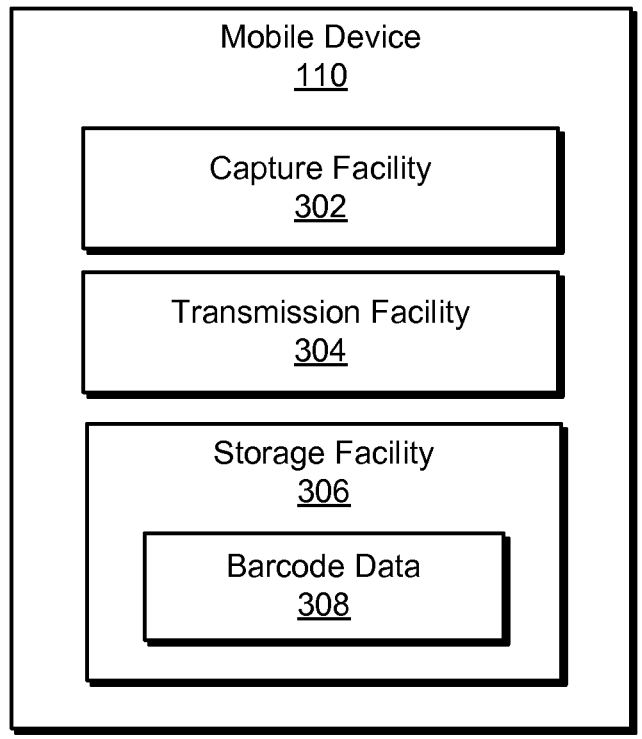
FIG. 3 illustrates an exemplary mobile device of the system of FIG. 1 according to principles described herein.

FIG. 3 illustrates an exemplary implementation of mobile device 110. As shown, mobile device 110 may include a capture facility 302, a transmission facility 304, and a storage facility 306 selectively and communicatively coupled to one another. It will be recognized that although facilities 302-306 are shown to be separate facilities in FIG. 3, any of facilities 302-306 may be combined into fewer facilities, such as into a single facility, or divided into more facilities as may serve a particular implementation. Any suitable communication technologies, including any of the communication technologies mentioned herein, may be employed to facilitate communications between facilities 302-306.

Capture facility 302 may be configured to capture a displayed barcode (e.g., a barcode provided by access device 104 for display on a display screen associated with access device 104). For example, capture facility 302 may be configured to capture an image (e.g., a photograph) of a displayed barcode, scan a displayed barcode, and/or capture the displayed barcode in any other suitable manner. In some examples, capture facility 302 may include, be implemented by, and/or utilize a camera device to capture an image of a displayed barcode. For example, mobile device 110 may include an integrated camera device that user 108 may utilize to take a photograph of a displayed barcode. In additional or alternative examples, user 108 may utilize a separate camera device to take a photograph of a displayed barcode and upload the photograph to mobile device 110.

Transmission facility 304 may be configured to transmit data representative of a captured barcode to technical support subsystem 114. For example, transmission facility 304 may be configured to utilize mobile network 112 to transmit data representative of an image of a barcode (e.g., an image captured by capture facility 302) to technical support subsystem 114. Transmission facility 304 may be configured to utilize any suitable communication technologies disclosed herein to transmit data representative of a captured barcode to technical support subsystem 114. For example, transmission facility 304 may be configured to utilize a multimedia messaging service ("MMS") message or an e-mail message to transmit data representative of an image of a barcode to technical support subsystem 114. Additionally or alternatively, transmission facility 304 may be configured to upload an image of a barcode to a webpage associated with technical support subsystem 114.

Storage facility 306 may be configured to maintain barcode data 308 representative of one or more barcodes (e.g., images of barcodes captured by capture facility 302). Storage facility 306 may be configured to maintain additional or alternative data as may serve a particular implementation.

Figure 4:
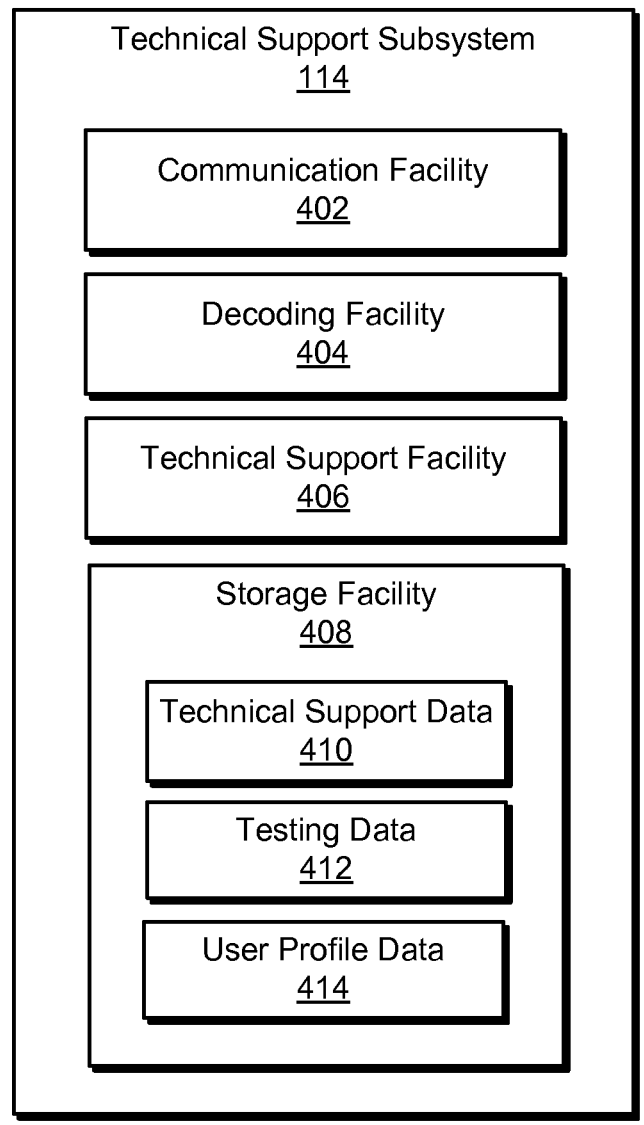
FIG. 4 illustrates an exemplary technical support subsystem of the system of FIG. 1 according to principles described herein.

FIG. 4 illustrates an exemplary implementation of technical support subsystem 114. As shown, technical support subsystem 114 may include a communication facility 402, a decoding facility 404, a technical support facility 406, and a storage facility 408. It will be recognized that although facilities 402-408 are shown to be separate facilities in FIG. 4, any of facilities 402-408 may be combined into fewer facilities, such as into a single facility, or divided into more facilities as may serve a particular implementation. Any suitable communication technologies, including any of the communication technologies mentioned herein, may be employed to facilitate communications between facilities 402-408.

Communication facility 402 may be configured to receive data representative of a barcode from mobile device 110 (e.g., by way of mobile network 112) utilizing any suitable communication technologies, such as disclosed herein. In some examples, communication facility 402 may be configured to receive data representative of an image of a barcode in conjunction with an MMS message or an e-mail message. For example, communication facility 402 may receive an MMS message or an e-mail message from mobile device 110 with the image attached thereto. In additional or alternative examples, communication facility 402 may be configured to receive data representative of an image of a barcode by way of a webpage upload. For example, communication facility 402 may be configured to generate, provide, and/or manage a webpage configured to facilitate the uploading of barcode images and/or user 108 may utilize mobile device 110 to upload an image of a barcode to the webpage associated with technical support subsystem 114. Additionally or alternatively, communication facility 402 may be configured to receive data representative of a barcode in any other suitable manner, including any suitable form of electronic data transfer.

Decoding facility 404 may be configured to decode a barcode (e.g., a barcode received by communication facility 402 from mobile device 110) and/or process the corresponding data to obtain technical support request information encoded into the barcode as well as any other information encoded into the barcode. For example, decoding facility 404 may be configured to decode the barcode utilizing any suitable barcode technologies and/or symbologies, such as disclosed herein. Decoding facility 404 may forward any information obtained from a barcode to technical support facility 406.

Technical support facility 406 may be configured to perform one or more technical support operations in response to technical request information. For example, technical support facility 406 may be configured to perform with one or more tests (e.g., diagnostic tests, line tests, service quality tests, etc.) associated with provider subsystem 102, access device 104, network 106, and/or any other component of system 100. In some examples, technical support facility 406 may utilize the tests to detect, diagnose, and/or resolve problems associated with access device 104, network 106, and/or provider subsystem 102.

Additionally or alternatively, technical support facility 406 may be configured to initiate a communication (e.g., a telephone call, a chat, a text message, etc.) between a technical support agent (e.g., agent 116) and a user (e.g., user 108). For example, technical support facility 406 may be configured to automatically initiate an outbound phone call to mobile device 110 in accordance with technical support request information (e.g., a callback number, a callback date, a callback time period, etc.) received from mobile device 110 and/or automatically initiate a corresponding inbound phone call to agent 116 in accordance with the availability of agent 116. In certain embodiments, technical support facility 406 may be configured to place a "virtual hold" for user 108 within a queue of phone calls and/or automatically initiate a phone call to user 108 when the virtual hold reaches the front of the queue. In additional or alternative examples, technical support facility 406 may provide (e.g., in conjunction with an initiated phone call) any information received from mobile device 110 (e.g., technical support request information), and/or any corresponding test information resulting from tests performed by technical support facility 406 to agent 116. Agent 116 may then utilize the phone call and/or received information to resolve one or more problems being experienced by user 108 and/or associated with access device 104. In the foregoing manner, the problems associated with access device 104 and/or experienced by user 108 may be efficiently and conveniently resolved and/or the disadvantages associated with traditional technical support methods and systems may be limited and/or eliminated.

In additional or alternative examples, technical support facility 406 may be configured to authenticate the identity of user 108 and/or uniquely interact with user 108 based on the user's authenticated identity. For example, if user 108 is a field technician on site at the location of access device 104, user 108 may provide a specific username, employee ID, password, and/or token to be encoded into the barcode provided to technical support subsystem 114, and technical support facility 406 may utilize this information to authenticate the field technician's identity. Based on the field technician's authenticated identity, technical support facility 406 may perform one or more technical support operations unique to field technicians. For example, technical support facility 406 may provide the field technician with access to technical support options not available to the general public, place the field technician in contact with a technical support agent specifically trained and/or staffed to interact with field technicians, and/or uniquely interact with the field technician in any other suitable manner. Accordingly, user 108 may be able to avoid the burdensome process of authenticating the user's identity during a phone call and/or by way of an interactive voice response system.

Storage facility 408 may be configured to maintain technical support data 410 representative of technical support request information, testing data 412 representative of test information associated with one or more tests performed by technical support facility 406, and/or user profile data 414 representative of user profile information associated with user 108. Storage facility 408 may be configured to maintain additional or alternative data as may serve a particular implementation.

Figure 5:
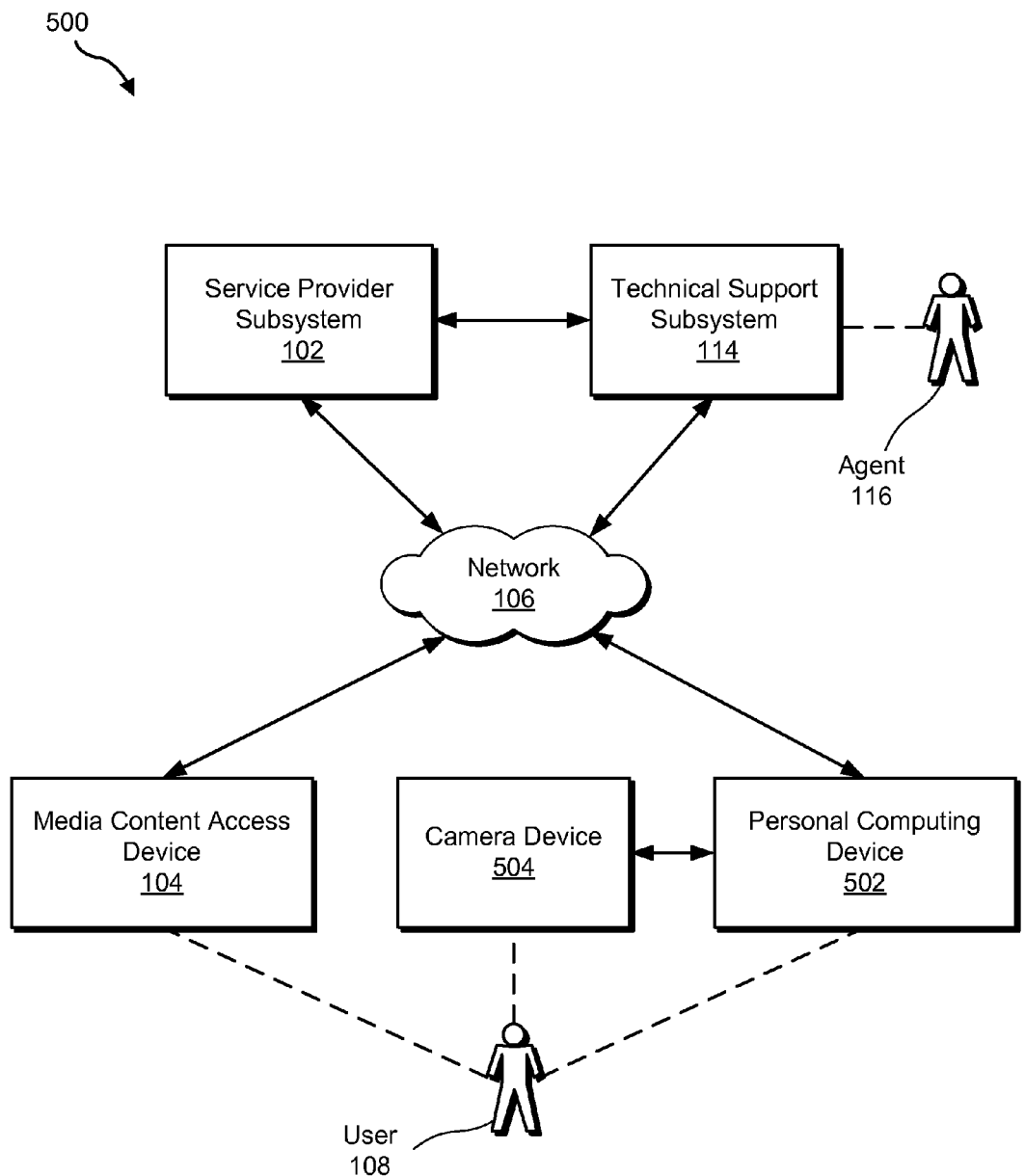
FIG. 5 illustrates an exemplary implementation of the system of FIG. 1 according to principles described herein.

In some exemplary implementations of system 100, mobile network 112 may be omitted. For example, FIG. 5 illustrates an exemplary implementation 500 of system 100 in which mobile network 112 is not present. Implementation 500 may be particularly useful in situations where the technical support problems experienced by access device 104 are local and/or specific to access device 104 (e.g., the problems do not extend to network 106 and/or provider subsystem 102). Accordingly, user 108 may utilize network 106 to communicate with technical support subsystem 114. As further shown in FIG. 5, mobile device 110 may be replaced by a personal computing device 502 (e.g., a desktop PC) and/or a separate camera device 504 (e.g., a handheld digital camera) configured to communicatively couple to each other (e.g., by way of a USB cable). Accordingly, user 108 may utilize camera device 504 to take a photograph of a barcode displayed by access device 104 (e.g., a barcode representative of technical support request information obtained from user 108), upload the photograph to personal computing device 502, and/or utilize personal computing device 502 to transmit (e.g., via an e-mail, a webpage upload, etc.) data representative of the photograph to technical support subsystem 114 by way of network 106. Thereafter, as explained above, technical support subsystem 114 may perform one or more technical support operations in response to the technical support request received from personal computing device 502.

Figure 7:
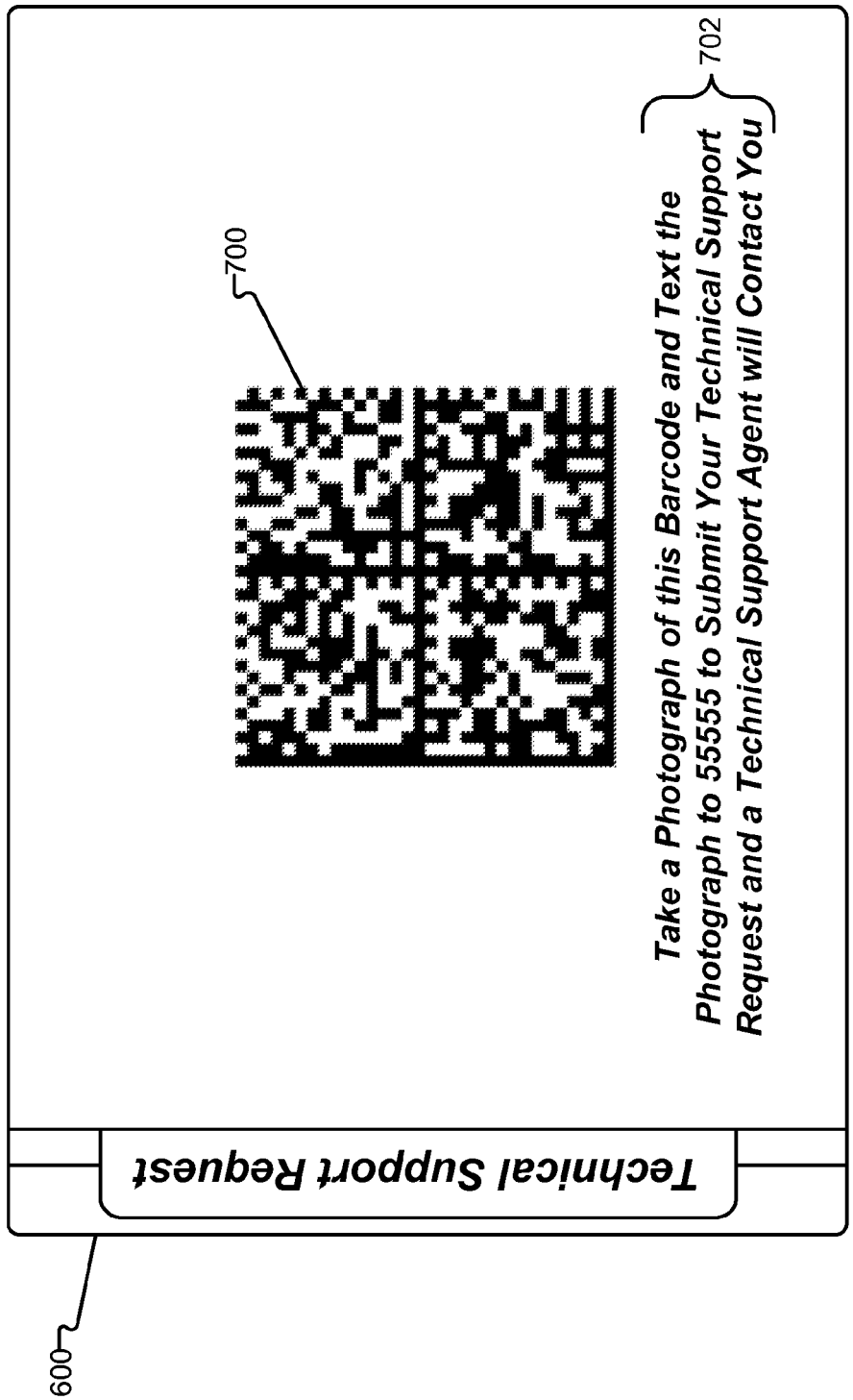

As mentioned above, access device 104 may be configured to generate, provide, and/or manage a graphical user interface configured to facilitate the receipt of technical support request information from user 108. FIGS. 6-7 illustrate views of an exemplary graphical user interface 600 (or simply "GUI 600") that may be provided in accordance with the principles disclosed herein. In some examples, access device 104 may present GUI 600 in response to a detected problem associated with access device 104, a detected inability of access device 104 to communicate with technical support subsystem 114, and/or a request received from user 108.

As shown in FIG. 6, GUI 600 may include one or more fields 602 by way of which a user may input technical support request information. For example, fields 602 may include one or more selectable fields, form-fillable fields, drop-down lists, and/or any other suitable fields configured to facilitate the input of technical support request information. As shown, in some examples, fields 602 may be configured to facilitate the input of a contact name, an account number, a callback phone number, a callback phone type, a callback date, and/or a callback time. Accordingly, a user may utilize an input device (e.g., a remote control device, a keypad, etc.) to input the corresponding technical support request information into fields 602. Additionally or alternatively, GUI 600 may include one or more selectable options 604 and 606 by way of which a user may "Submit" inputted technical support request information and/or "Clear" inputted technical support request information.

In response to a submission of technical support request information by way of GUI 600, access device 104 (e.g., encoding facility 204) may be configured to encode the submitted technical support request information and/or any other corresponding information into a barcode and/or provide the barcode for display by way of GUI 600. To illustrate, FIG. 7 illustrates an exemplary view of GUI 600 including a displayed barcode 700. As mentioned above, barcode 700 may include encoded data representative of technical support request information obtained from the user by way of GUI 600. GUI 600 may additionally or alternatively include instructions 702 configured to instruct the user to take a photograph of barcode 700 and/or text message the photograph to a particular telephone number or short code number associated with technical support subsystem 114 to submit the technical support request. Accordingly GUI 600 may facilitate the entry of technical support request information and/or submission of a technical support request to technical support subsystem 114.

Figure 8:
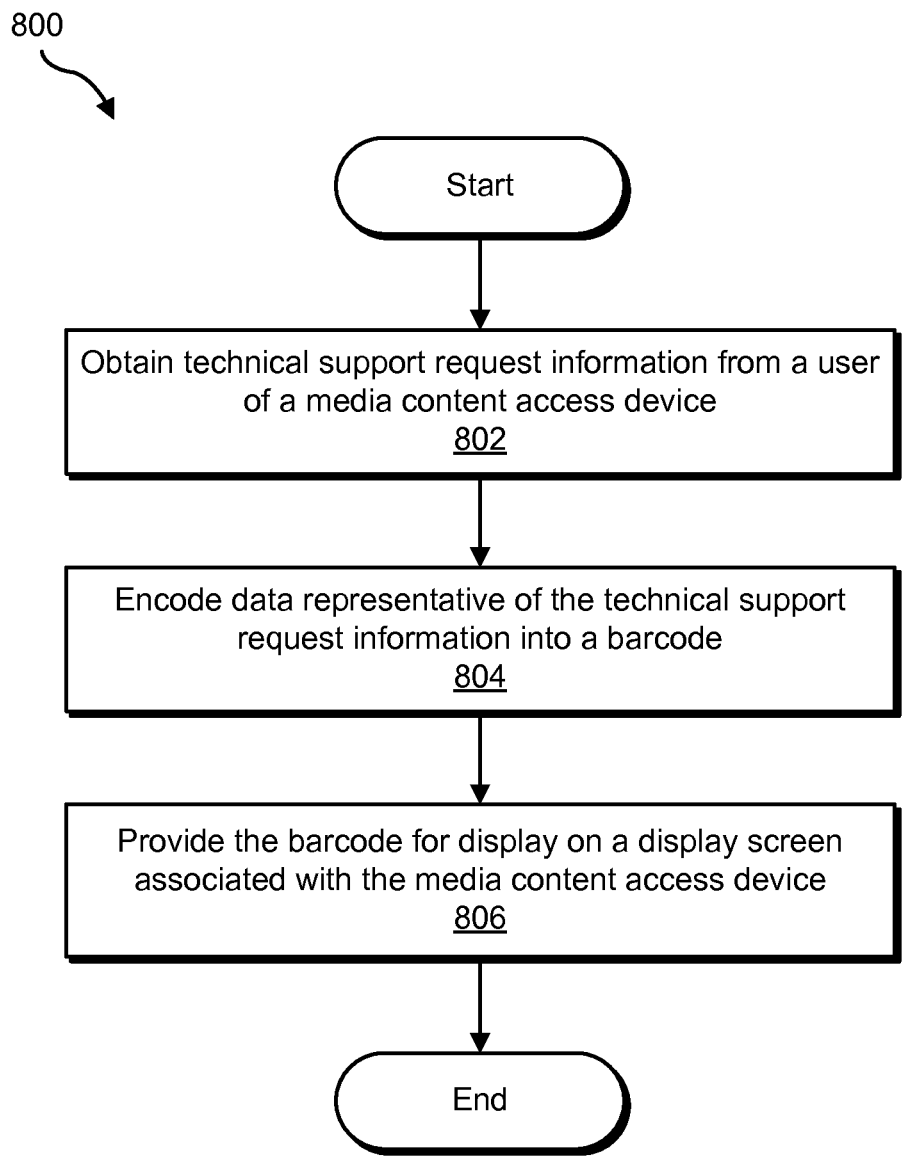
FIG. 8 illustrates an exemplary technical support method according to principles described herein.

FIG. 8 illustrates an exemplary technical support method 800. While FIG. 8 illustrates exemplary steps according to one embodiment, other embodiments may omit, add to, reorder, and/or modify any of the steps shown in FIG. 8. The steps shown in FIG. 8 may be performed by any component or combination of components of system 100.

In step 802, a media content access device obtains technical support request information from a user of the media content access device. For example, access device 104 and/or technical support facility 202 may be configured to obtain the technical support request information from the user in any suitable manner, such as disclosed herein.

In step 804, the media content access device encodes data representative of the technical support request information into a barcode. For example, access device 104 and/or encoding facility 204 may encode the technical support request information into the barcode in any suitable manner, such as disclosed herein.

In step 806, the media content access device provides the barcode for display on a display screen associated with the media content access device. For example, access device 104 and/or display facility 206 may be configured to provide the barcode for display on a display screen in any suitable manner, such as disclosed herein.

Figure 9:
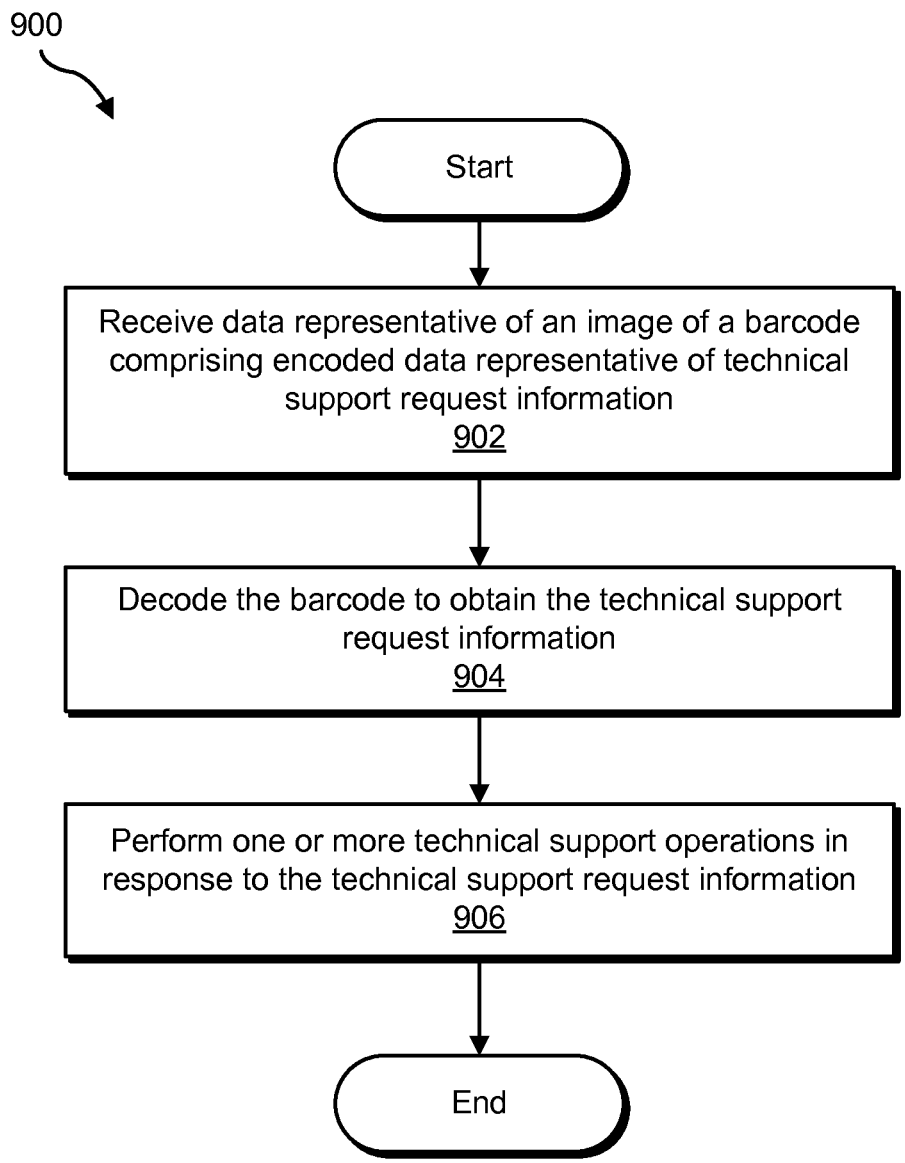
FIG. 9 illustrates another exemplary technical support method according to principles described herein.

FIG. 9 illustrates another exemplary technical support method 900. While FIG. 9 illustrates exemplary steps according to one embodiment, other embodiments may omit, add to, reorder, and/or modify any of the steps shown in FIG. 9. The steps shown in FIG. 9 may be performed by any component or combination of components of system 100.

In step 902, a technical support subsystem receives data representative of an image of a barcode comprising encoded data representative of technical support request information. For example, technical support subsystem 114 and/or communication facility 402 may receive the data representative of the image in any suitable manner, such as disclosed herein.

In step 904, the technical support subsystem decodes the barcode to obtain the technical support request information. For example, technical support subsystem 114 and/or decoding facility 404 may decode the barcode to obtain the technical support request information in any suitable manner, such as disclosed herein.

In step 906, the technical support subsystem performs one or more technical support operations in response to the technical support request information. For example, technical support subsystem 114 and/or technical support facility 406 may perform the technical support operations in any suitable manner, such as disclosed herein.

In certain embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
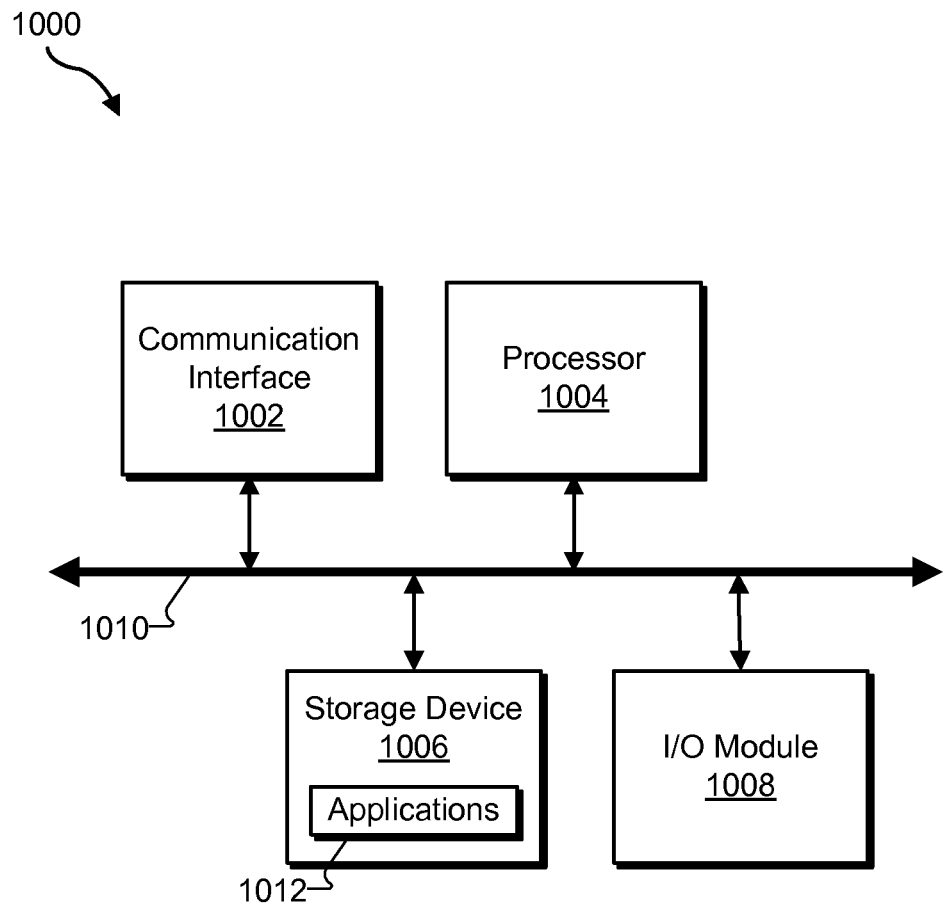
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may be configured to interface with any suitable communication media, protocols, and formats, including any of those mentioned above. In at least one embodiment, communication interface 1002 may facilitate a communicative connection between one or more components of system 100.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., a touch screen display), a receiver (e.g., an RF or infrared receiver), and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the features described herein may be implemented and/or performed by one or more components of computing device 1000. For example, one or more applications 1012 residing within storage device 1006 may be configured to direct processor 1004 to perform one or more processes or functions associated with technical support facility 202, encoding facility 204, display facility 206, capture facility 302, transmission facility 304, communication facility 402, decoding facility 404, and/or technical support facility 406. Likewise, storage facility 208, storage facility 306, and/or storage facility 408 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   presenting, by a media content access device, a graphical user interface including one or more fields configured to facilitate input of technical support request information from a user of the media content access device;
   receiving, by the media content access device by way of at least one of the one or more fields included in the graphical user interface, the input of the technical support request information from the user of the media content access device;
   encoding, by the media content access device into a barcode, data representative of the technical support request information input by the user in the at least one of the one or more fields included in the graphical user interface; and
   providing, by the media content access device, the barcode for display on a display screen associated with the media content access device.

2. The method of claim 1, further comprising detecting, by the media contact access device, an inability to communicate with a remote service provider subsystem associated with the media content access device.

3. The method of claim 2, wherein the presenting, the receiving, the encoding, and the providing are performed in response to the detecting.

4. The method of claim 1, wherein the technical support request information comprises at least one of a callback phone number, a callback date, a callback time period, and a contact name.

5. The method of claim 1, further comprising capturing, by a camera device associated with a mobile device, an image of the displayed barcode.

6. The method of claim 5, further comprising transmitting, by the mobile device, data representative of the image to a remote technical support subsystem.

7. The method of claim 6, further comprising:
receiving, by the remote technical support subsystem, data representative of the image; and
decoding, by the remote technical support subsystem, the barcode to obtain the technical support request information.

8. The method of claim 7, further comprising performing, by the remote technical support subsystem in response to the technical support request information, one or more technical support operations.

9. The method of claim 8, wherein the performing the one or more technical support operations comprises at least one of initiating a telephone call between the user and a technical support agent and performing one or more tests associated with the media content access device.

10. The method of claim 1, further comprising encoding, by the media content access device into the barcode, data representative of at least one of a serial number associated with the media content access device, an account number associated with the user, location information associated with the media content access device, diagnostic information associated with the media content access device, and computing environment information associated with the media content access device.

11. The method of claim 1, wherein the user comprises a field technician and the technical support request information comprises authentication information associated with the field technician.

12. The method of claim 1, embodied as computer-executable instructions on at least one non-transitory computer-readable medium.

13. A method comprising:
receiving, by a technical support subsystem from a mobile device associated with a user, data representative of an image of a barcode comprising encoded data representative of technical support request information input by the user into one or more fields included in a graphical user interface presented by a media content access device;
decoding, by the technical support subsystem, the barcode to obtain the technical support request information; and
performing, by the technical support subsystem, one or more technical support operations in response to the technical support request information.

14. The method of claim 13, wherein the data representative of the image is received by way of a mobile communication network.

15. The method of claim 13, wherein the receiving the data representative of the image comprises receiving an upload of the image by way of a webpage.

16. The method of claim 13, wherein the data representative of the image is received in conjunction with a multimedia messaging service message.

17. The method of claim 13, wherein the performing the one or more technical support operations comprises initiating a telephone call between the user and a technical support agent.

18. The method of claim 17, wherein the performing the one or more technical support operations further comprises providing the technical support request information to the technical support agent in conjunction with the telephone call.

19. The method of claim 13, wherein the performing the one or more technical support operations comprises performing one or more tests associated with the technical support request information.

20. The method of claim 13, embodied as computer-executable instructions on at least one non-transitory computer-readable medium.

21. The method of claim 13, wherein the technical support request information comprises at least one of a callback phone number, a callback date, a callback time period, and a contact name.

22. A media content access device comprising:
a technical support facility configured to:
present, on a display screen associated with the media content access device, a graphical user interface including one or more fields configured to facilitate input of technical support request information from a user of the media content access device, and
receive the input of the technical support request information from the user of the media content access device by way of at least one of the one or more fields included in the graphical user interface;
an encoding facility communicatively coupled to the technical support facility and configured to encode into a barcode data representative of the technical support request information input by the user in the at least one of the one or more fields included in the graphical user interface; and
a display facility communicatively coupled to the encoding facility and configured to provide the barcode for display on the display screen associated with the media content access device.

23. A system comprising:
a communication facility configured to receive, from a mobile device associated with a user, data representative of an image of a barcode comprising encoded data representative of technical support request information input by the user into one or more fields included in a graphical user interface presented by a media content access device;
a decoding facility communicatively coupled to the communication facility and configured to decode the barcode to obtain the technical support request information; and
a technical support facility communicatively coupled to the decoding facility and configured to perform one or more technical support operations in response to the technical support request information.

24. A system comprising:
a media content access device configured to
present, on a display screen associated with the media content access device, a graphical user interface including one or more fields configured to facilitate input of technical support request information from a user of the media content access device, receive, by way of at least one of the one or more fields included in the graphical user interface, input of the technical support request information from the user of the media content access device, encode into a barcode data representative of the technical support request information input by the user in the at least one of the one or more fields included in the graphical user interface, and provide the barcode for display on a display screen associated with the media content access device;

a mobile device configured to capture an image of the displayed barcode, and transmit data representative of the image; and a technical support subsystem configured to receive, from the mobile device, the data representative of the image, decode the barcode to obtain the technical support request information, and perform one or more technical support operations in response to the technical support request information.

* * * * *